(12) United States Patent
Kayanuma (10) Patent No.: US 7,167,206 B2
(45) Date of Patent: Jan. 23, 2007

(54) CRADLE FOR INFORMATION APPARATUS, CRADLE FOR DIGITAL CAMERA AND CAMERA SYSTEM

(75) Inventor: Yasunobu Kayanuma, Asaki (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 598 days.

(21) Appl. No.: 10/118,909

(22) Filed: Apr. 10, 2002

(65) Prior Publication Data
US 2002/0149695 A1 Oct. 17, 2002

(30) Foreign Application Priority Data
Apr. 12, 2001 (JP) ............................ 2001-114313
Mar. 6, 2002 (JP) ............................ 2002-060183

(51) Int. Cl.
*H04N 5/225* (2006.01)
(52) U.S. Cl. .................................... 348/375; 348/207.2
(58) Field of Classification Search ................ 348/375, 348/374, 373, 376, 207.1, 207.2, 231.1, 231.7, 348/231.9, 552; 358/909.1; 701/207
See application file for complete search history.

(56) References Cited
U.S. PATENT DOCUMENTS

| | | | | |
|---|---|---|---|---|
| 4,937,676 A * | 6/1990 | Finelli et al. | ............... | 348/375 |
| 5,488,558 A * | 1/1996 | Ohki | .................... | 701/207 |
| 5,506,617 A * | 4/1996 | Parulski et al. | ............ | 348/552 |
| 5,926,285 A * | 7/1999 | Takahashi | .............. | 358/909.1 |
| 6,337,712 B1 * | 1/2002 | Shiota et al. | ............... | 348/552 |
| 6,552,743 B1 * | 4/2003 | Rissman | ..................... | 348/375 |
| 6,600,510 B1 * | 7/2003 | Parulski et al. | .......... | 348/211.2 |
| 6,693,665 B1 * | 2/2004 | Shindo et al. | ........... | 348/207.2 |
| 6,734,915 B1 * | 5/2004 | Nagaoka | ..................... | 348/375 |
| 6,867,887 B1 * | 3/2005 | Meyer | .................... | 358/909.1 |
| 7,027,172 B1 * | 4/2006 | Parulski et al. | ............ | 714/718 |
| 2002/0071035 A1 * | 6/2002 | Sobol | ......................... | 348/373 |
| 2002/0072935 A1 * | 6/2002 | Rowse et al. | .................. | 705/4 |
| 2003/0011705 A1 * | 1/2003 | Nakatsu et al. | ............. | 348/375 |
| 2003/0117499 A1 * | 6/2003 | Bianchi et al. | ............. | 348/373 |
| 2003/0142215 A1 * | 7/2003 | Ward et al. | ............... | 348/207.1 |
| 2003/0214602 A1 * | 11/2003 | Battles et al. | ............... | 348/375 |
| 2004/0201774 A1 * | 10/2004 | Gennetten | .................... | 348/375 |
| 2005/0190265 A1 * | 9/2005 | Small | ...................... | 348/207.2 |

FOREIGN PATENT DOCUMENTS

JP 6-44050 6/1994

* cited by examiner

*Primary Examiner*—Aung Moe
(74) *Attorney, Agent, or Firm*—Birch, Stewart, Kolasch & Birch, LLP (57) ABSTRACT

A cradle is capable of supplementing convenience of a portable information apparatus such as a digital camera of which functions including an image display function and a removable medium are omitted. If the camera is mounted on a camera mounting section of the cradle, a camera connector is electrically connected to a cradle connector in synchronization with a mounting operation thereof. The control circuit contained in the cradle detects a connection of the camera, and automatically starts communication between them. The image stored in the internal memory of the camera is sent to the cradle side, and is displayed on a liquid crystal display.

17 Claims, 8 Drawing Sheets

CRADLE FOR INFORMATION APPARATUS, CRADLE FOR DIGITAL CAMERA AND CAMERA SYSTEM

BACKGROUND OF THE INVENTION

1. Field of the Invention

The present invention relates to a cradle for an information apparatus, a cradle for a digital camera and a camera system, and in particular, to the cradle and the camera system suitable for a low-priced digital camera of which image display function, removable media and so on are omitted.

2. Description of the Related Art

Japanese Utility Model Application Publication No. 6-44050 discloses a configuration wherein a first electronic apparatus such as a portable telephone and a second electronic apparatus equivalent to a cradle thereof are connected. Not only in the field of the portable telephone but also in the field of a digital still camera, a system for charging a battery in the camera and/or exchanging data between the camera and an external apparatus such as a personal computer by using the cradle is known.

In addition, many models of a low-priced digital still camera called a toy camera are released in recent years, and are broadly accepted by consumers as handily image-capturable camera. In general, this kind of digital still camera is manufactured by using an image-pickup circuit (approximately in common among the manufacturers) which has the number of pixels of a VGA or lower class and is almost general-purpose, and boldly low pricing thereof is implemented by omitting functions. For instance, it has a camera configuration wherein a removable medium for storing an image and a liquid crystal monitor for image display and so on are omitted.

In the case of the digital still camera of which removable medium is omitted as described above, however, the number of image-capturable frames (the number of capturable images) is limited since the images are stored in a memory built into the camera (internal memory). In addition, as a liquid crystal monitor for image display is omitted, the user cannot confirm the recorded image with the camera itself, so that convenience of the digital still camera is sacrificed.

SUMMARY OF THE INVENTION

As the present invention has been implemented in consideration of these circumstances, an object thereof is to provide a cradle and a camera system capable of supplementing the convenience of a portable information apparatus such as a toy camera of which functions are omitted.

In order to achieve the above object, the present invention is directed to a cradle for an information apparatus, the cradle comprising: an apparatus mounting section which removably receives the information apparatus; a communication device which performs communication with the information apparatus mounted on the apparatus mounting section; a display device which displays information based on data received from the information apparatus through the communication device; and a control device which controls delivery of the data by the communication device and also controls display of the display device.

The present invention covers a cradle for various information apparatuses such as a portable telephone, a personal digital assistant (PDA) or a portable music player. The information apparatus can be removably mounted on an apparatus mounting section of the cradle, and when using it, it can be separated from the cradle and can be used by itself. It is possible, by setting the information apparatus on the cradle, to keep the information apparatus on the cradle and connect them to be capable of communication through the communication device (a first communication device) so as to allow delivery of various data between them.

For instance, the image data stored in the information apparatus is transferred to the cradle side through the communication device, and the image thereof is displayed on a display device of the cradle. In addition, the information stored in the information apparatus such as titles and artist names of a music file is transferred to the cradle side through the communication device, so that textual information such as the titles are displayed on the display device of the cradle. Accordingly, it is possible, even for the information apparatus without a display function, to check the image and so on by using the cradle of the present invention.

According to an embodiment of the present invention, the cradle may further comprise: a signal processing device which converts the data received from the information apparatus into a signal for display; and a storing device for display which stores the data for display generated by the signal processing device.

It is possible, by providing the signal processing device which generates the signal for display inside the cradle and the storing device which display which stores the data for display, to omit these device on the information apparatus side.

In order to achieve the above object, the present invention is also directed to a cradle for an information apparatus, the cradle comprising: an apparatus mounting section which removably receives the information apparatus; a communication device which performs communication with the information apparatus mounted on the apparatus mounting section; a media insertion section which receives a removable medium; a media interface section for performing at least one of a process of reading information from the removable medium mounted on the media insertion section and a process of recording information on the removable medium; and a control device which controls delivery of the data by the communication device and also controls at least one of the process of reading the information from the removable medium and the process of recording the information thereon.

According to the present invention, the data stored in the information apparatus is transferred to the cradle side through the communication device, and the data is stored on the removable medium (external record medium) mounted on the cradle. In the case where memory capacity on the information apparatus side is insufficient, the data can be easily backed up by using the cradle of the present invention. In addition, it is possible to read the data (images and sound) recorded on the removable medium through the cradle and output it to the display device and a sound output device provided to the cradle. As for the removable medium, while it is desirable to have a configuration to allow both reading and writing (recording) processes, appropriate effects can be obtained if at least one of the processes can be implemented.

Preferably, the cradle further comprises: a communication device for an external apparatus which performs communication with the external apparatus, wherein the control device controls the delivery of data by the communication device for the external apparatus.

According to the present invention, it is possible, in the cradle for the information apparatus of the present invention, to transfer the data to and from an external apparatus such as a personal computer by way of the cradle in a form wherein the communication device which performs communication with such an external apparatus (a second communication device) such as the personal computer is added apart from the communication device which performs communication with the information apparatus mounted on the cradle. Moreover, various communication interfaces capable of mutual communication, whether cable or radio, are applicable to the communication device between the information apparatus and the cradle (a first communication device) and the communication device which performs communication with an external apparatus (a second communication device) such as the personal computer.

In order to achieve the above object, the present invention is also directed to a cradle for a digital camera, the cradle comprising: a camera mounting section which removably receives the digital camera; a first communication device which performs communication with the digital camera mounted on the camera mounting section; an image display device which displays an image received through the first communication device; and a control device which controls delivery of data by the first communication device and also controls display of the image display device.

According to the present invention, the digital camera can be removably mounted on the camera mounting section of the cradle, and when capturing an image, the digital camera is separated from the cradle so as to capture an image with the camera by itself. The digital camera has a device which converts a picked-up image into digital image data and recording it on a record medium (an internal memory or an external memory). If the digital camera is mounted on the cradle, the camera is connected to the cradle through the first communication device to be capable of communication, and the delivery of data becomes possible between them. The image data stored in the digital camera is transferred to the cradle side through the first communication device, and the image is displayed on the image display device of the cradle. Accordingly, even the digital camera without an image display function can check the image by using the cradle of the present invention.

In order to achieve the above object, the present invention is also directed to a cradle for a digital camera, the cradle comprising: a camera mounting section which removably receives the digital camera; a first communication device which performs communication with the digital camera mounted on the camera mounting section; a data storing device which stores data received through the first communication device; and a control device which controls delivery of the data by the first communication device and also controls reading and writing from and to the data storing device.

According to the present invention, the image data stored in the digital camera is transferred to the cradle side through the first communication device, and the image thereof is stored in the data storing device in the cradle. In the case where the memory capacity on the camera side is insufficient, the image data can be easily backed up by using the cradle of the present invention, and so it is possible, after storing the image data in the cradle, to erase the memory on the camera side so as to record a new image.

The data storing device may be either device which writes data to a removable external record medium such as a memory card or a device which writes data to an internal record medium such as a large capacity fixed memory.

Preferably, the cradle further comprises: an image display device which displays an image received through the first communication device, wherein the control device controls display of the image display device.

According to another embodiment of the present invention, the cradle may further comprise: a second communication device which performs communication with an external apparatus, wherein the control device controls the delivery of data by the second communication device.

Preferably, the cradle further comprises a battery for a power supply so as to be usable by battery driving. While the cradle in the past was a type wherein power is supplied from an AC power adapter or something similar on the assumption of a stationary usage form, it is possible, according to the present invention, to use the cradle irrespective of the place since the battery is mounted. It is possible, by carrying the cradle together with the camera and mounting the camera thereon as required, to check the image and back up the image data so as to supplement the convenience of the camera.

According to an embodiment of the present invention, the digital camera may comprise: an image pickup device which converts an optical image into an electric signal; an image-capturing instruction device which instructs the image pickup device to perform image-capturing; an internal storing device which stores the image obtained through the image pickup device according to an instruction from the image-capturing instruction device; and a third communication device which performs delivery of information with the cradle, the third communication device being connected to the first communication device in synchronization with operation of mounting of the digital camera on the camera mounting section, wherein the digital camera does not has: an image display device which displays the image stored in the internal storing device; and an external storing device which stores the image obtained through the image pickup device on the removable medium.

The cradle of the present invention can supplement such a fault of the digital camera by being used in combination with the digital camera of which an image display device and removable medium are omitted.

The present invention is also directed to a camera system, comprising: the above-described cradle; and a digital camera mountable on the cradle, the digital camera comprising: an image pickup device which converts an optical image into an electric signal; an image-capturing instruction device which instructs the image pickup device to perform image-capturing; an internal storing device which stores the image obtained through the image pickup device according to an instruction from the image-capturing instruction device; and a third communication device which performs delivery of information with the cradle, the third communication device being connected to the first communication device in synchronization with operation of mounting of the digital camera on the camera mounting section, wherein the digital camera does not has: an image display device which displays the image stored in the internal storing device; and an external storing device which stores the image obtained through the image pickup device on the removable medium.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereafter, preferred embodiments of a cradle for an information apparatus, a cradle for a digital camera and a camera system according to the present invention will be described by referring to the attached drawings.

Figure 1:
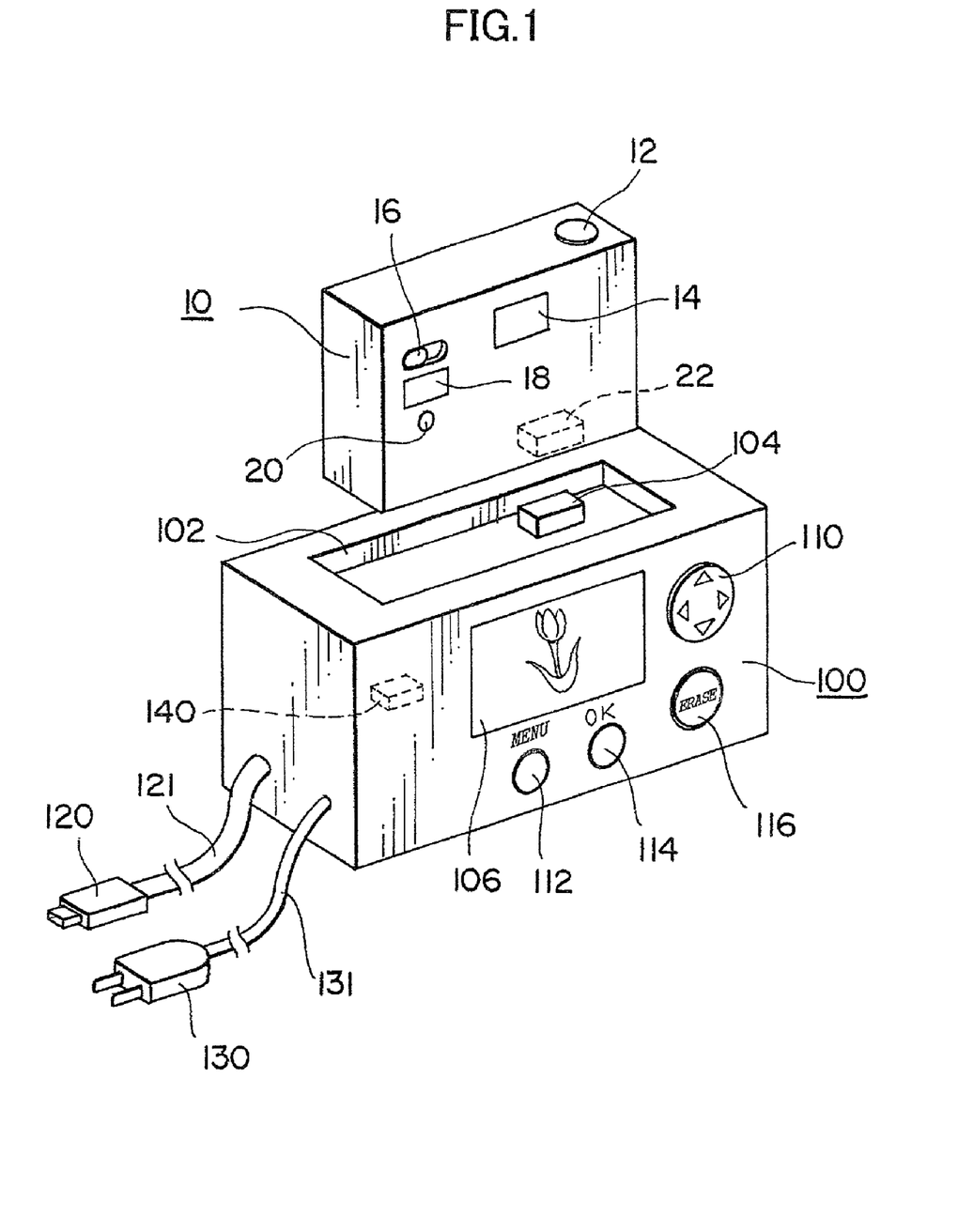
FIG. 1 is a perspective view of a camera system according to a first embodiment of the present invention.

FIG. 1 is a perspective view of the camera system according to a first embodiment of the present invention. A camera 10 is a low-priced digital still camera of a limited function type classified as a toy camera, and has a shutter-release button 12, an optical finder 14, a power switch 16, a liquid crystal display 18 and a mode switching button 20, and besides, a connector (hereafter, referred to as a camera connector) 22 for electrically connecting to a cradle 100 is provided at a camera bottom.

The liquid crystal display 18 is a simplified display for displaying the number of capturable images and a mode state with characters and simple symbols, whereas the camera 10 does not have an image display device (such as a liquid crystal monitor) for reproducing and displaying a recorded image and so on. The mode switching button 20 is a mode switching device which switches an operation mode of the camera 10, and each time the mode switching button 20 is pushed, the modes can be switched in a circulating fashion in order of a "high resolution image-capturing mode"→a "low resolution image-capturing mode"→an "image erasure mode"→a "self image-capturing mode"→a "serial image-capturing mode," for instance. The contents of the liquid crystal display 18 are changed according to a selected mode.

If the "high resolution image-capturing mode" or the "low resolution image-capturing mode" is selected, the number of capturable images in the image-capturing mode is displayed on the liquid crystal display 18. If the shutter-release button 12 is pushed at this time, the image-capturing is performed. The image captured by the image-capturing operation is recorded in an internal memory 48 (see FIG. 2) of the camera 10 after undergoing predetermined signal processing, and if recording is completed, the display of the number of capturable images on the liquid crystal display 18 is changed. In addition, if the "image erasure mode" is selected with the mode switching button 20, the characters "CL" meaning "clear" is displayed on the liquid crystal display 18. At this time, all the images stored in the camera 10 are erased at once by operating it according to a predetermined operating procedure.

A recess portion as a camera mounting section 102 is formed on a top face of a cradle 100, and a cradle connector 104 for electrically connecting with the camera 10 is provided at the bottom of this recess portion. If the camera 10 is mounted on the camera mounting section 102, the camera connector 22 is coupled to the cradle connector 104 in synchronization with the mounting operation so that they are electrically connected.

For a communication interface between the camera 10 and the cradle 100, various interfaces such as USB, IrDa, IEEE 1394 and other serial interfaces and parallel interfaces are applicable. In the present embodiment, a USB interface is applied. Moreover, in an embodiment wherein a rechargeable battery is used for the power source of the camera 10, each of the cradle connector 104 and the camera connector 22 includes a composite terminal in which a USB terminal, a power source terminal for charging and another signal conveyance terminal, as required, are put together in a connector.

The cradle 100 has a liquid crystal display 106 as an image display device and also has an operating section such as a cross button 110, a menu button 112, an OK button 114 and an erasure button 116. The liquid crystal display 106 is a device which reproduces and displays the images recorded in the camera 10, and also serves as a device which displays various kinds of information such as an operating menu and warning messages. The cross button 110 is a multifunction button capable of inputting instructions of four directions of up, down, right and left, also serves as an operating button for providing an instruction for selecting various setting items and changing setting contents on a menu screen, and also serves as a device which provides an instruction for magnification adjustment and frame forward/reverse of the images to be reproduced when reproducing the images.

The menu button 112 is used when displaying the menu screen, and display modes thereof such as a one frame reproduction mode, an automatic reproduction (slide show) mode and multi-screen division and reproduction (multi-reproduction) mode can be switched by the button operation, and it is thereby possible to switch an erasure method such as one frame erasure or all-frame erasure. The OK button 114 is used when providing an instruction for confirming the selected contents and performing (checking) a process on the menu screen. The erasure button 116 is used when providing an instruction for erasing the image, canceling an item selected from the menu and so on.

In addition, the cradle 100 has a communication terminal (USB terminal in the present embodiment) 120 for or sending and receiving the data to and from an external apparatus such as a personal computer (not shown in FIG. 1), and allows two-way communication with the external apparatus connected through the USB terminal 120. Reference numeral 130 denotes a line cord plug, and 131 denotes a power cable. An AC power supply inputted by inserting the line cord plug 130 into an outlet of a commercial power supply (not shown) is converted into a DC power supply, and is used as the power supply of the cradle 100. Moreover, it is desirable that the power cable 131 and a USB cable 121 have a configuration detachably connectable on the cradle 100.

A control circuit 140 is mounted inside the cradle 100. The control circuit 140 performs the delivery of the data by controlling the communication with the camera 10 connected through the cradle connector 104, and also controls the display of the liquid crystal display 106 and the communication with the external apparatus such as the personal computer.

Figure 2:
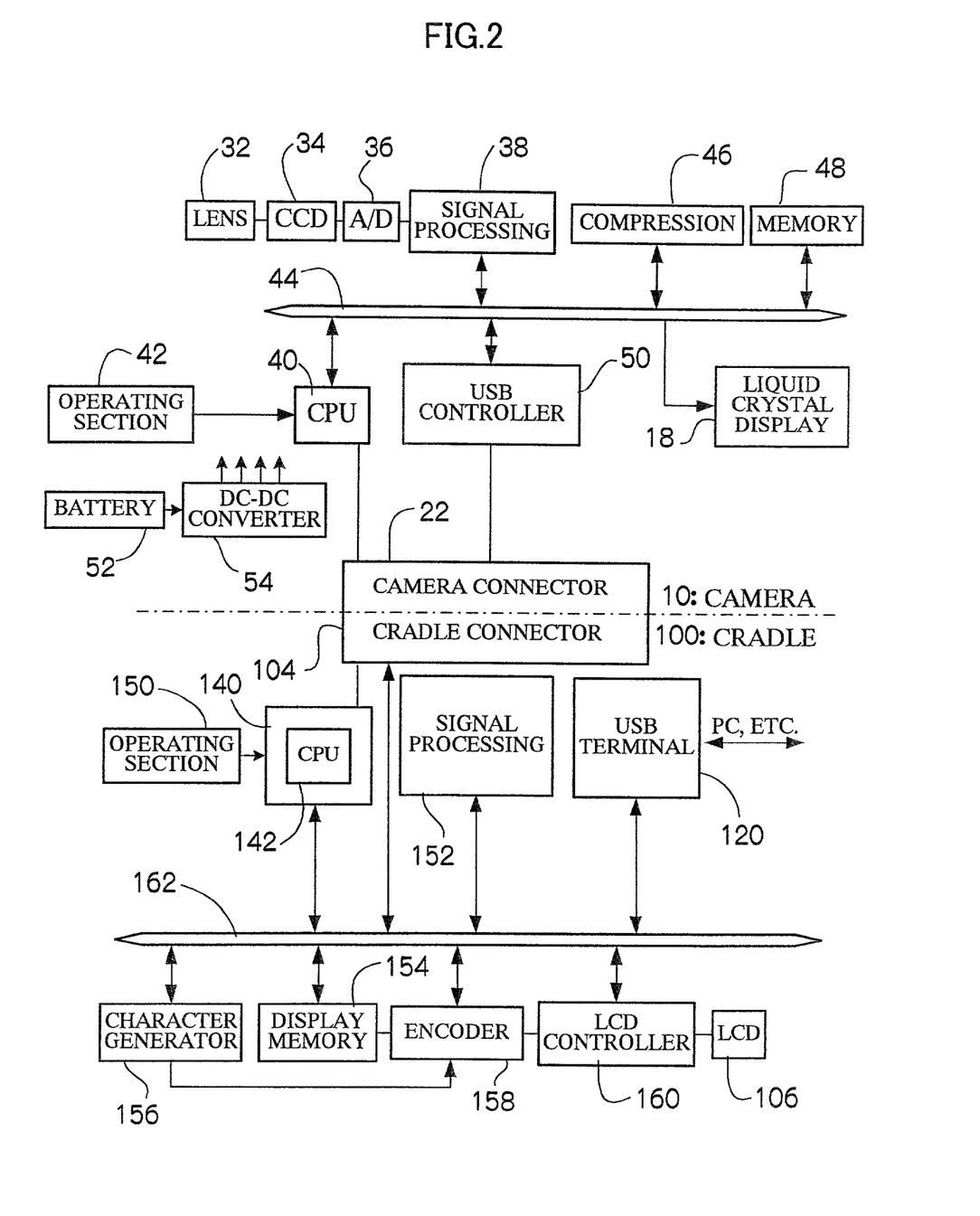
FIG. 2 is a block diagram showing an internal configuration of a camera and a cradle shown in FIG. 1.

FIG. 2 is a block diagram showing an internal configuration of the camera 10 and the cradle 100 shown in FIG. 1. Light incident through a taking lens 32 has an image formed on a light-receptive surface of a CCD image sensor (hereafter referred to as CCD) 34 as an image pickup element.

The light-receptive surface of the CCD 34 has photo-sensors equivalent to photosensitive pixels two-dimensionally arranged thereon, and has a predetermined color filter arrangement configuration such as a G stripe or a Bayer arrangement. In addition, the CCD 34 has a so-called electronic shutter function of controlling storage time (shutter speed) of charges stored on each photo-sensor by a shutter gate pulse. It is also possible to use another image pickup device such as a CMOS image sensor instead of the CCD 34.

A subject image formed on the light-receptive surface of the CCD 34 through the taking 32 is converted by each photo-sensor into a signal charge of an amount according to an incident light amount. The signal charges thus stored are sequentially read as voltage signals (image signals) according to the signal charges according to the pulse added from a CCD driver (not shown). The image signal outputted from the CCD 34 undergoes predetermined analog signal processing such as a sampling hold process, a color separation process and a gain adjustment process, so that it is converted into a digital signal by an A/D converter 36 thereafter.

The digital image data outputted from the A/D converter 36 is sent to a signal processing section 38. The signal processing section 38 functions as an image processing device including a luminance/color difference signal generation circuit, a gamma control circuit, a sharpness control circuit, a contrast control circuit, a white balance control circuit and so on, and processes the image signals in compliance with a command of a CPU 40. An operating section 42 is a block including various control switches such as the shutter-release button 12, power switch 16 and mode switching button 20 described in FIG. 1. If the shutter-release button 12 is pushed, an image-capturing start instruction (release-on) signal is issued, and the CPU 40 detects the release-on signal so as to perform an image capturing operation for recording.

To be more specific, the image data captured in response to pushing of the shutter-release button 12 is converted into the luminance signal (Y signal) and the color difference signal (Cr Cb signal) in the signal processing section 38, and also has a predetermined process such as gamma control performed. Thus, the image data processed in the signal processing section 38 is sent to a compression processing section 46 through a bus 44, and is compressed according to a JPEG (Joint Photographic Experts Group) format or another predetermined format in the compression processing section 46, and then is recorded in an internal memory (unremovable memory built in the camera 10) 48. Although the camera 10 in the present embodiment uses the internal memory 48 as the device which stores the image data, the device which stores the image is not limited to the internal memory 48, and a variation is also possible wherein a removable medium such as a memory card is used.

The CPU 40 of the camera 10 is the control section for, according to an input signal received from the operating section 42, controlling the operation of a corresponding circuit. The CPU 40 performs various computations such as a focus evaluation and AE computations from the image data captured in response to half pushing of the shutter-release button 12, and controls a lens driving section (not shown) according to the computation results so as to move the taking lens 32 to a focal position, and on the other hand, it controls a diaphragm mechanism (not shown) and also controls charge storage time of the CCD 34. Moreover, a variation is also possible wherein a taking optical system of which depth of field is deep such as a pan focus lens is adopted to omit an AF function. Moreover, in addition to controlling the image-capturing operation, the CPU 40 performs control of an image data recording process, capacity management of the internal memory 48, display control of the liquid crystal display 18, communication control using a USB controller 50 and so on.

A battery 52 is used for the power supply of the camera 10. The power supplied from the battery 52 is converted into a required voltage by a DC-DC converter 54, and is supplied thereafter to each circuit block. A handily available commercial primary battery (AA or AAA alkaline battery, etc.) is used for the battery 52. As a matter of course, a variation using a rechargeable battery is also possible.

On the other hand, the cradle 100 has the aforementioned control circuit 140, liquid crystal display 106, USB terminal 120, and an operating section 150 such as the cross button 110 provided thereon, and besides, it has a signal processing section 152 for performing signal processing required for image reproduction and so on, a display memory 154, a character generator 156, an encoder 158, an LCD controller 160, and a bus 162 for having these circuits connected provided thereon. The control circuit 140 includes a CPU 142 and peripheral circuits thereof, and according to the input signal received from the operating section 150, controls the corresponding circuit, and controls the display of the liquid crystal display 106, the communication between the camera and the cradle and the communication with the external apparatus connected through the USB terminal 120 and so on.

According to the camera system configured as above, when the camera connector 22 is connected to the cradle connector 104, the control circuit 140 in the cradle 100 detects it (automatic detection using a plug & play function), and automatically starts USB communication between the camera and the cradle. The image data stored in the internal memory 48 of the camera 10 is sent to the cradle 100 side through the USB controller 50. The image data captured in the cradle 100 through the cradle connector 104 undergoes a predetermined process in the signal processing section 152, and is stored thereafter in the display memory 154 through the bus 162.

The data stored in the display memory 154 is sent to the encoder 158, where it is converted into a signal in a predetermined system for display (such as a color composite image signal in the NTSC system) together with the data of characters and symbols provided from the character generator 156. The signal processed by the encoder 158 is supplied to the liquid crystal display 106 through the LCD controller 160. Thus, the image is displayed on the liquid crystal display 106.

If the cross button 110 provided on the cradle 100 is operated, an instruction signal thereof is conveyed to the CPU 40 on the camera 10 side, and the frame forward or reverse of a reproduced image is possible. In addition, it is possible, by operating the erasure button 116, to selectively delete unnecessary images in the internal memory 48. Even if there is no image display device provided on the camera 10 side, it is possible to delete unnecessary images by easily determining them since the images can be checked on the liquid crystal display 106 of the cradle 100. It is also feasible, by mounting the camera 10 on the cradle 100 and selecting an "automatic reproduction mode" in a reproduction menu thereof, to enjoy a slide show automatically reproducing the images stored in the camera 10 in sequence.

Moreover, although the camera 10 according to this embodiment has the operating section 150 for reproducing operation on the cradle 100 side since the number of operating buttons is rendered minimum due to the nature of the toy camera, a variation is also possible wherein the operating section 42 provided on the camera 10 side also serves as the operating section for reproducing operation (for cradle operation), in which case the operating section on the cradle 100 side can be omitted.

Figure 3:
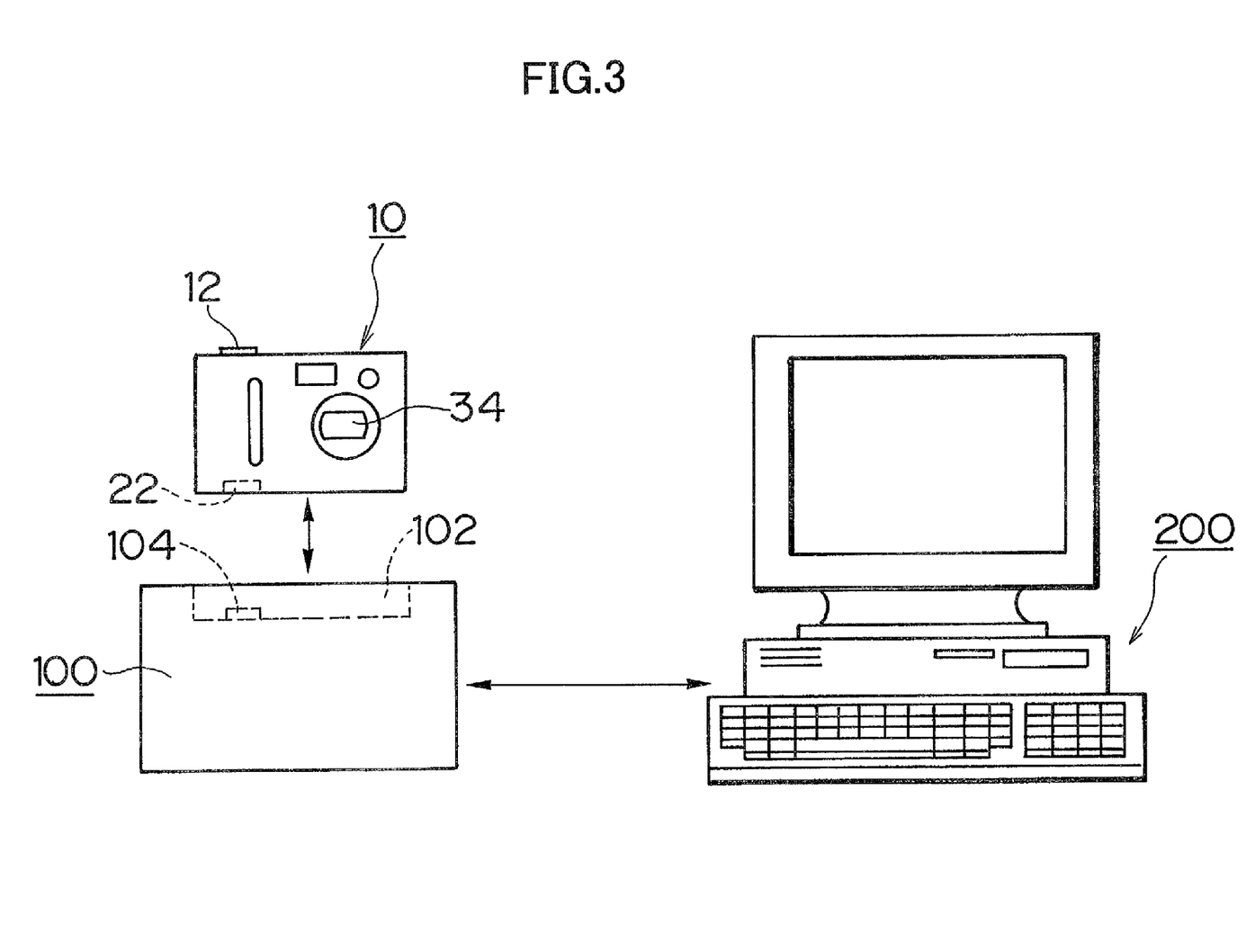
FIG. 3 is a system configuration diagram showing a connectivity relationship among the camera, the cradle and a personal computer.

Furthermore, as shown in FIG. 3, the cradle 100 according to this embodiment is capable of the two-way communication with the external apparatus such as a personal computer 200. If the cradle 100 is connected to the personal computer 200 in a state where the camera 10 is mounted on the cradle 100, it becomes possible to send and receive the data between the camera and the personal computer by way of the cradle 100. It is thereby feasible to transfer the image in the camera 10 to the personal computer 200 and provide the image and other data to the camera 10 from the personal computer 200.

Even in the case where the camera 10 is removed from the cradle 100, it is possible to perform the two-way communication with the personal computer 200 with the cradle 100 by itself, and the images and so on received from the personal computer 200 side can be displayed on the liquid crystal display 106 of the cradle 100. In addition, it is also possible to store the images and so on received from the personal computer 200 in the memory or the removable medium in the cradle 100 in the case where the cradle 100 has a large capacity fixed memory for storing the images or an interface for the removable medium in the cradle 100.

In the case where the cradle 100 is used by connecting it to the personal computer 200, the display of the personal computer 200 can be used as that for a user interface. Hence, a variation is also desirable wherein the control is exerted, when the personal computer 200 is connected, to automatically turn off (render nondisplay) the liquid crystal display 106 of the cradle 100.

While the above-mentioned cradle 100 has the configuration to have the power supplied through the power cable 131, a variation is also possible wherein the power cable 131 is omitted or a large-capacity battery (not shown) is contained for concurrent use therewith. As the cradle capable of battery driving is usable even in a place where there is no outlet, it is possible, by carrying such a cradle together with the camera, to check, erase or back up the image at any time as required no matter where it may be.

Next, another embodiment of the present invention will be described.

Figure 4:
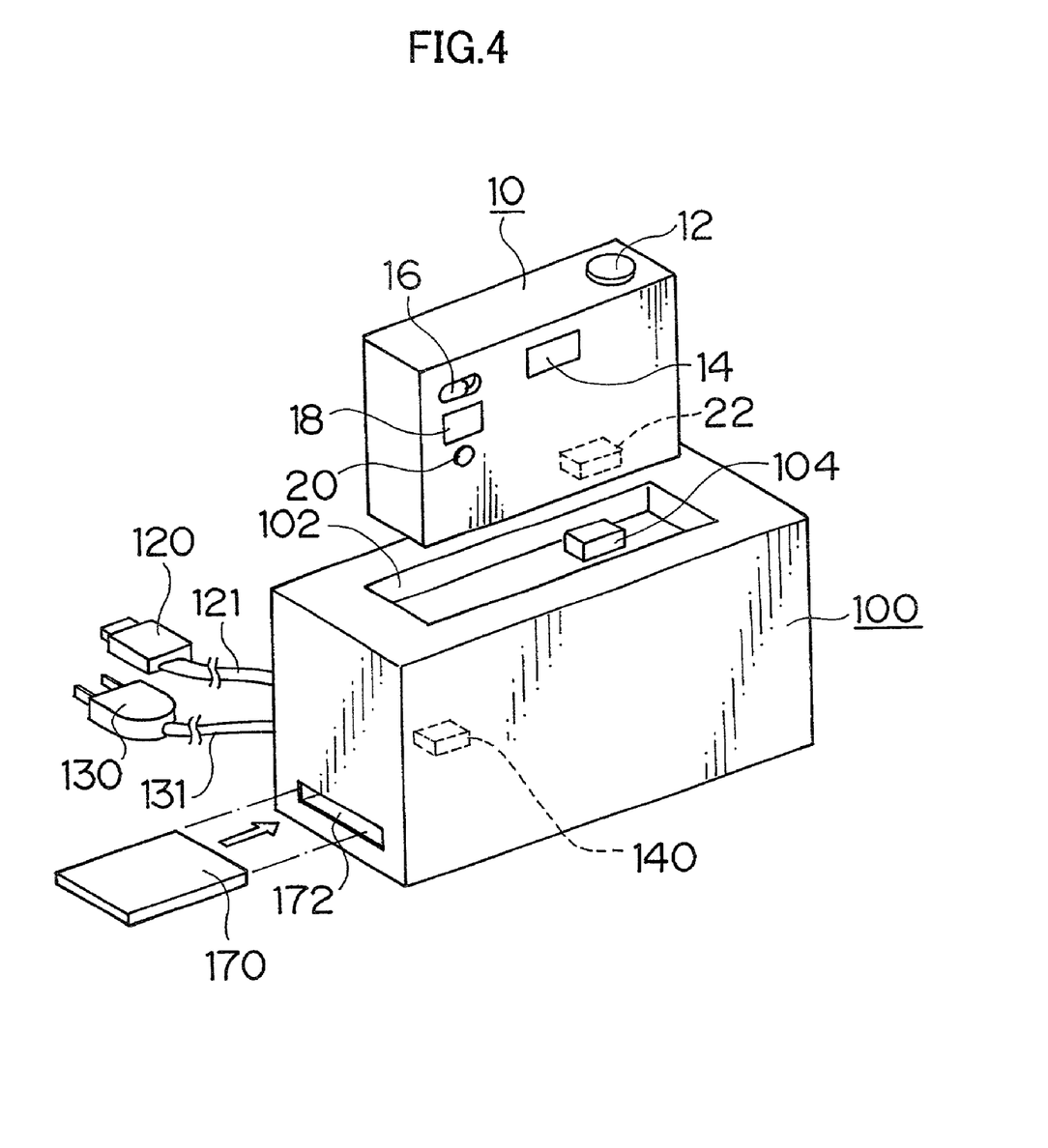
FIG. 4 is a perspective view of the camera system according to a second embodiment of the present invention.

FIG. 4 is a perspective view of the camera system according to a second embodiment of the present invention. In this drawing, the portions which are the same as or similar to the example shown in FIG. 1 are numbered likewise, and description thereof will be omitted. The cradle 100 shown in FIG. 4 has a memory card slot (removable medium mounting section) 172 for mounting and removing a memory card 170. In the cradle 100, a card interface circuit (not shown in FIG. 4) for reading and writing the data on the memory card 170 is provided, and the control circuit 140 controls the reading and writing of the memory card 170. While FIG. 4 shows the cradle 100 having the liquid crystal display 106 omitted, a variation is also possible wherein the memory card slot 172 is added to the cradle having the liquid crystal display described in FIG. 1.

According to the camera system shown in FIG. 4, if the camera 10 is mounted on the camera mounting section 102 of the cradle 100, the camera connector 22 is connected to the cradle connector 104 in synchronization with the mounting operation. The control circuit 140 of the cradle 100 automatically detects a connection of the camera 10, and performs the process of writing the image data stored in the camera 10 to the memory card 170.

After the image data stored in the camera 10 is written to the memory card 170, it is possible to erase the image data in the camera 10. It is feasible either to have it programmed to automatically perform a series of processes of transferring the image data from the camera 10 to the cradle 100→writing it to the memory card 170→erasing the internal memory 48 by the control circuit 140, the CPU 40 in the camera or coordination thereof, or to have the configuration wherein a user performs the predetermined operation as required and the processes are performed according to such an operation.

Furthermore, it is also possible to have the configuration wherein the above-mentioned automatic backup function and an image transfer processing function by a user operation can be selectively switched. In addition, as a deformed example of the above embodiment, it is also possible to contain a large capacity storage device (such as a hard disk) in the cradle 100 instead of or in concurrent use with the memory card 170.

As described above, if the image data in the camera 10 is completely transferred to the memory card 170, it is possible to prevent the same image data from being duplicatively written to the memory card 170 (double backup) by automatically erasing the image data from the internal memory 48 of the camera 10.

In addition, it is desirable to take measures to prevent the double backup in a control form wherein the transferred image data is not automatically deleted from the internal memory 48 of the camera 10 (a variation wherein the image data is held in the camera 10 even after the image transfer and the data is deleted according to an erasure instruction by the user operation). For instance, there is the control form wherein, on data transfer, a file list of the internal memory 48 is compared to the file list of the memory card 170 on the cradle side so as to transfer only different image files. In addition, there is also a variation wherein an identification symbol (such as flag information) indicating that it was already transferred is recorded for the transferred image (backed-up image), so that the transferred image can be distinguished from the ones yet to be transferred (images yet to be backed up).

Next, a further embodiment of the present invention will be described.

Figure 5:
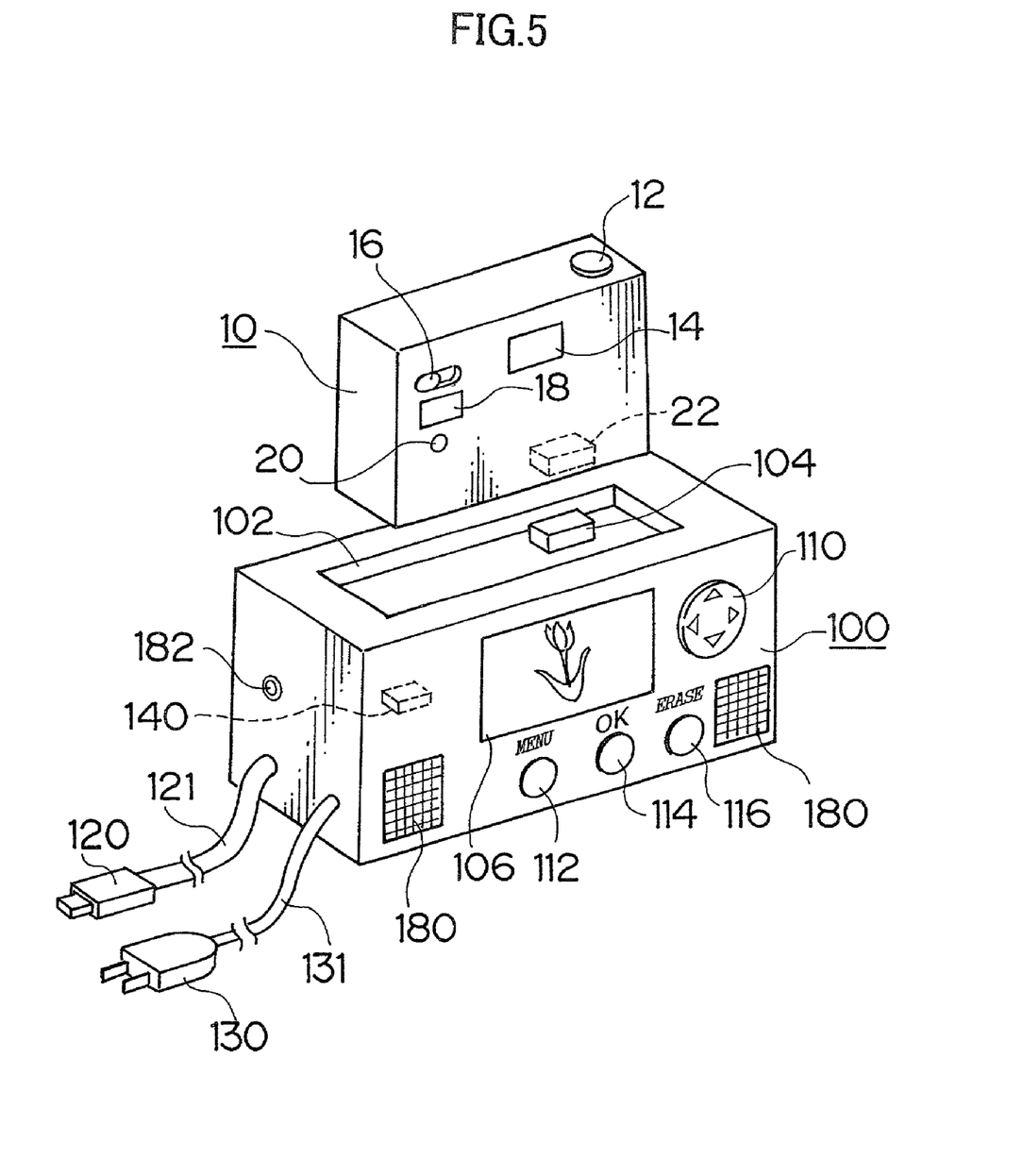
FIG. 5 is a perspective view of the camera system according to a third embodiment of the present invention.
Figure 6:
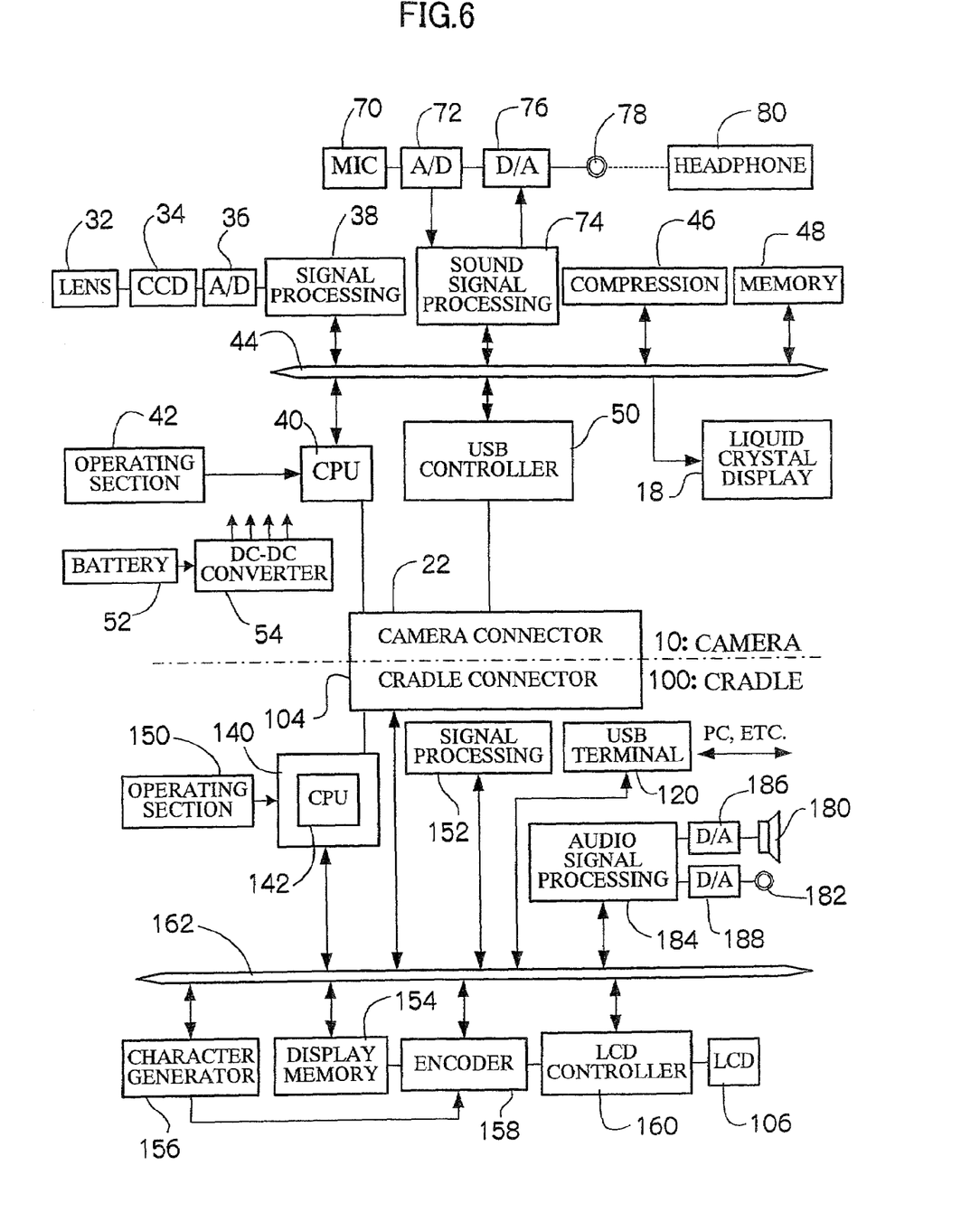
FIG. 6 is a block diagram showing the internal configuration of the camera and the cradle shown in FIG. 5.

FIG. 5 is a perspective view of the camera system according to a third embodiment of the present invention, and FIG. 6 is a block diagram thereof. In these drawings, the portions which are the same as or similar to the examples shown in FIG. 1 and FIG. 2 are numbered likewise, and description thereof will be omitted. As shown in FIG. 5, the cradle 100 has a pair of speakers 180 capable of outputting stereo sound and a sound output terminal (audio out) 182 provided thereon.

In addition, as shown in FIG. 6, the cradle 100 has an audio signal processing section 184 provided therein, and the audio signal processing section 184 is connected to the bus 162. A digital sound signal generated in the audio signal processing section 184 is converted into an analog sound signal through D/A converters 186 and 188, and is outputted thereafter to the pair of speakers 180 and the sound output terminal 182.

On the other hand, the camera 10 has a microphone 70 as a sound inputting device, an A/D converter 72 for converting a sound signal obtained from the microphone 70 into a digital signal, a sound signal processing section 74 for processing the sound signal, a D/A converter 76 for converting sound data generated in the sound signal processing section 74 into an analog signal and a sound output terminal 78 provided, and a headphone 80 is removably connected to the sound output terminal 78.

The sound signal processing section 74 is connected to the bus 44, and the compression processing section 46 also serves as a compression device of the image data and the sound data. In addition, the compression processing section 46 also has the device which functions as an expansion processing circuit.

The camera 10 has a function to record sound (sound recorder function) and a function to reproduce a music file (audio playback function) in addition to an image-capturing function. The camera 10 has an operating device (such as the mode switching button 20 or a mode switching dial (not shown)) for selectively switching the operation modes of an image-capturing mode, a reproduction mode, a sound recorder mode and an audio reproduction mode provided therein. Moreover, it is also feasible to exert control so that it automatically switches to the audio reproduction mode when it detects that the headphone 80 is connected to the sound output terminal 78.

Sound recording is rendered possible by setting the camera 10 in the sound recorder mode. The shutter-release button 12 also serves as a start/stop button of recording in the sound recorder mode.

The sound inputted from the microphone 70 is converted into an electric signal, and is converted into the digital signal by the A/D converter 72 and inputted in the sound signal processing section 74 thereafter. The sound signal processing section 74 converts the inputted sound data into a predetermined signal format. The sound data is converted into a predetermined file format (such as a WAVE format) as required, and is stored in the internal memory 48 of the camera 10.

When reproducing the sound, the sound data is read from the internal memory 48 and is sent to the sound signal processing section 74. And it is decoded in the sound signal processing section 74, and is converted into the analog signal by the D/A converter 76 and outputted thereafter to the headphone 80 through the sound output terminal 78. Thus, it is outputted as audible sound from the headphone 80. As a matter of course, a variation is also possible wherein a speaker (not shown) is provided on the camera 10 so as to output the generated sound from the speaker of the camera 10.

Next, the audio playback function will be described.

The audio playback function of the camera 10 is the function of reproducing the music file in an MP3 (MPEG-1 Audio Layer-III) format and so on recorded in the internal memory 48. It is assumed that the music files are downloaded to the internal memory 48 of the camera 10 from the personal computer, a music distribution terminal and so on. Moreover, the music file has attached information (data) on the contents thereof such as titles and artist names recorded therein. For instance, in the case of the MP3 file format, tune information such as the titles are written on a tag of the MP3 file, and the tag information is referred to when displaying the file information.

If the camera 10 is set in the audio mode, audio reproduction becomes possible. The operations such as play/stop and volume control of the music file are performed by a remote control operating section (not shown) provided to the headphone 80.

Compressed data of the music file read from the internal memory 48 is expanded to uncompressed music data through the compression processing section 46. This expanded music data is converted into the sound signal in the sound signal processing section 74 and outputted as the sound thereafter through the D/A converter 76 and the headphone 80. Moreover, the processing contents (recording/reproduction processing in the sound recorder mode, music file reproduction processing and so on) in the sound signal processing section 74 are switched according to a switching signal from the CPU 40.

Workings of the camera system shown in FIGS. 5 and 6 are as follows. If the camera 10 is set on the cradle 100, the CPU 142 of the cradle 100 determines the file contents (data type) stored in the internal memory 48 of the camera 10 and exerts control to automatically switch a reproducing function and so on according to the type thereof.

To be more specific, in the case where the music file is recorded in the internal memory 48, the music file is transferred to the cradle 100 side when the camera 10 is set on the cradle 100. The music file transferred to the cradle 100 is decoded through the audio signal processing section 184 and is converted into a required sound signal, and is outputted thereafter to the pair of speakers 180 through the D/A converters 186. In addition, it is possible to output reproduced music by connecting an audio output unit such as a headphone or an external speaker (not shown) to the sound output terminal 182 of the cradle 100.

In this case, the user can easily grasp a subject of reproduction by having at least one piece of the information on the title, artist name and tune time on the music file (preferably, all such information) displayed on the liquid crystal display 106 of the cradle 100. Furthermore, it is also possible to display the image on the liquid crystal display 106 of the cradle 100 in the case where the image data (the data equivalent to a jacket image or liner notes of a music CD album) is stored by associating it with one music file or a plurality of music files.

In addition, there is another form wherein a file list of the internal memory 48 is displayed on the liquid crystal display 106 of the cradle 100 so as to have the user select a subject file of reproduction. If the user selects a desired file, reproduction functions (music reproduction, image reproduction and sound reproduction) are automatically switched according to the file contents related to that selection so that necessary reproduction processing is performed.

Furthermore, in the case where the music file, the image file and a recorded sound file are mixedly recorded in the internal memory 48, the reproduction menu is displayed on the liquid crystal display 106 of the cradle 100 so that the user can select the processing contents such as "image reproduction," "music reproduction," "sound reproduction" and "file transfer (backup)."

In the third embodiment described above, while the digital camera concurrently having the sound recorder mode and the audio reproduction mode in addition to a still image-capturing mode was exemplified, the scope of application of the present invention is not limited to the digital camera having all these functions. The present invention is also applicable to the camera having the sound recorder mode and no audio reproduction mode, the camera having the audio reproduction mode and no sound recorder mode, and in addition, the camera having a mode for recording moving image with sound (movie filming mode) and so on.

Next, another embodiment of the present invention will be described.

Figure 7:
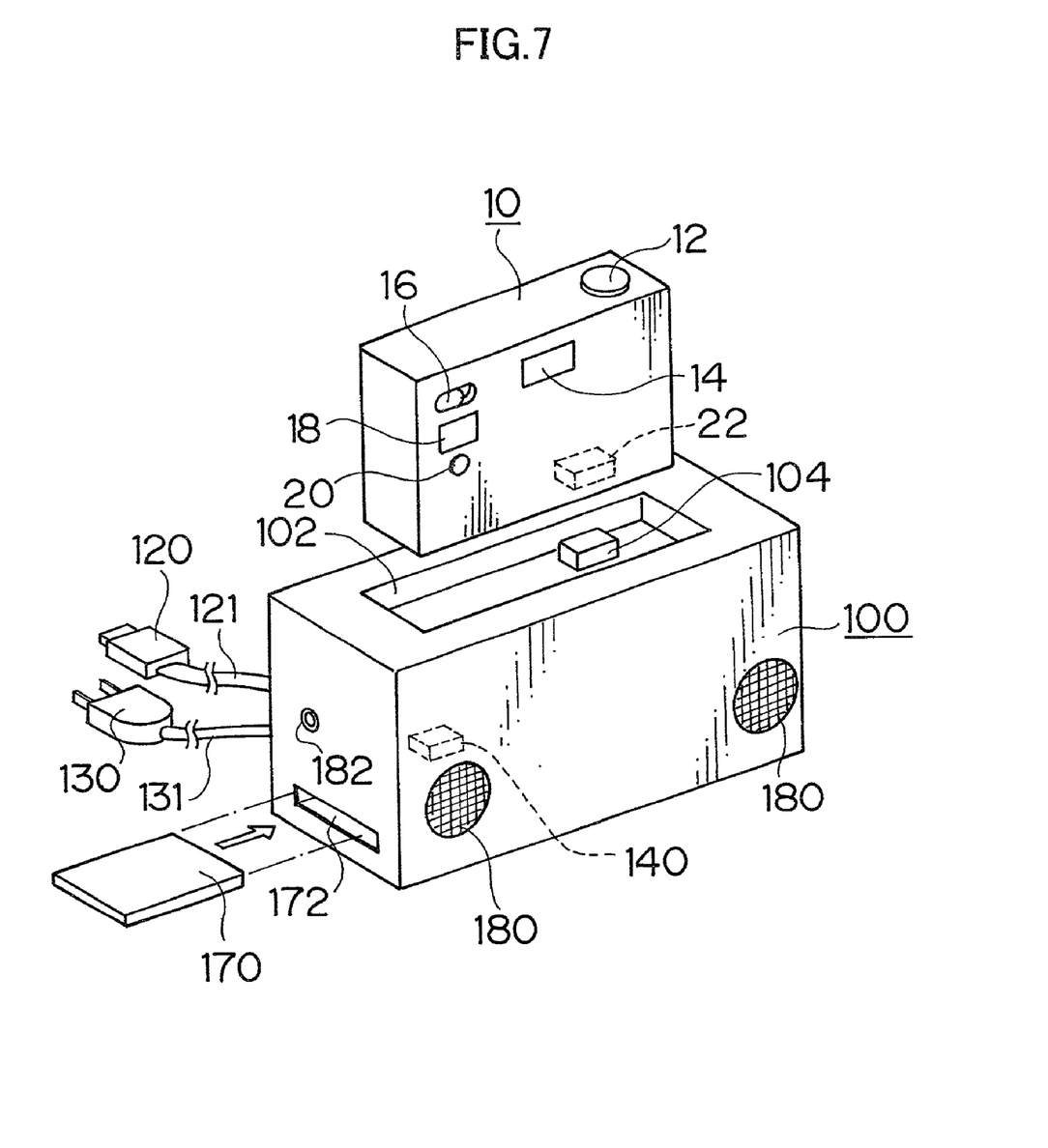
FIG. 7 is a perspective view of the camera system according to a fourth embodiment of the present invention.
Figure 8:
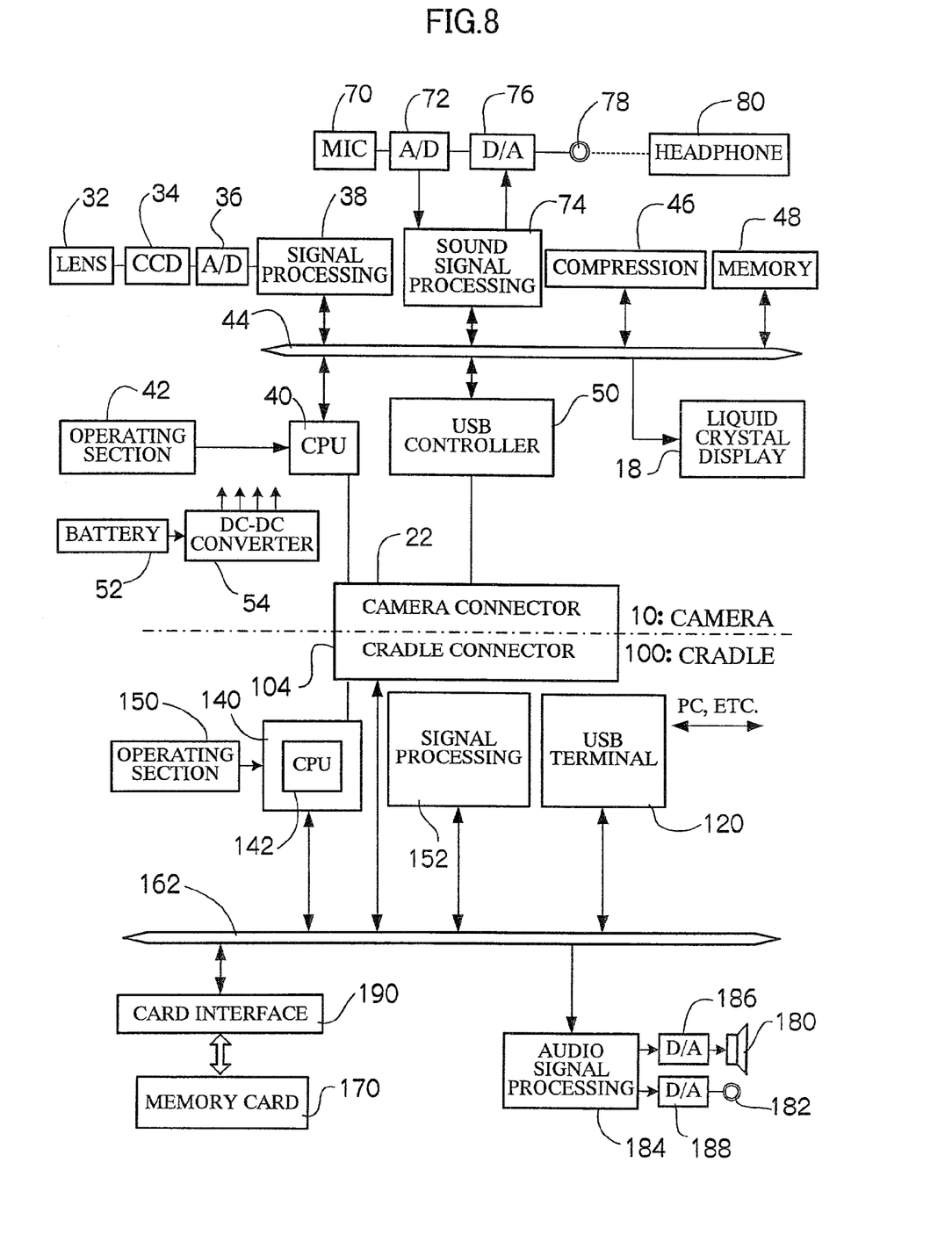
FIG. 8 is a block diagram showing the internal configuration of the camera and the cradle shown in FIG. 6.

FIG. 7 is a perspective view of the camera system according to a fourth embodiment of the present invention, and FIG. 8 is a block diagram thereof. In these drawings, the portions which are the same as or similar to the examples shown in FIGS. 4 to 6 are numbered likewise, and description thereof will be omitted.

The cradle 100 of the camera system shown in FIGS. 7 and 8 has the pair of speakers 180 and the sound output terminal (audio out) 182 provided thereon in addition to the memory card slot 172 for mounting and removing the memory card 170. And in the cradle 100, a card interface circuit 190 for reading and writing the data on the memory card 170 and the audio signal processing section 184 are provided as shown in FIG. 8, and the control circuit 140 controls the reading and writing of the memory card 170 and audio signal processing.

According to the camera system shown in FIGS. 7 and 8, it is possible, as with the camera system described in FIG. 4, to transfer an electronic file of the image, sound or music and so on stored in the internal memory 48 of the camera 10 to the memory card 170 and store it thereon. As a matter of course, the function of automatically erasing the transferred file and that of preventing the double backup are also possible as with the example described in FIG. 4.

In addition, according to the camera system shown in FIGS. 7 and 8, it is possible, as with the camera system described in FIGS. 5 and 6, to reproduce the music file and automatically switch the reproduction functions according to the file contents. Furthermore, it is possible to reproduce on the cradle 100 the image file, the sound file or the music file recorded on the memory card 170, and it is also possible to transfer the music file recorded on the memory card 170 to the internal memory 48 of the camera 10.

While the memory card 170 was exemplified as the removable medium in the above description, the form of the removable medium is not especially limited in implementing the present invention, and it is also possible to use various record media such as a magnetic disk, an optical disk and a magneto-optical disk in addition to a semiconductor memory represented by the memory card 170.

In addition, while the digital camera and the cradle thereof are illustrated in FIGS. 1 to 8, the scope of application of the present invention is not limited thereto, but it is applicable to various information apparatuses such as a portable telephone, an MD player, an MP3 player and a PDA and the cradle thereof. For instance, in the case where it is applied to a music reproduction apparatus and the cradle thereof, it is possible, by mounting the music reproduction apparatus on the cradle, to reproduce the music file from the speaker of the cradle.

As described above, according to the cradle for the information apparatus according to the present invention, it is possible, as a display device which displays the information and a control device which governs the communication control and the display control are provided on the cradle proper for mounting and removing the information apparatus, to check the contents of the information stored in the information apparatus by the display device of the cradle.

According to another form of the present invention, it is possible, as the interface for the removable medium is provided on the cradle, to transfer the data in the information apparatus to the cradle side and store it on the removable media. In addition, it is also possible to reproduce on the cradle the information stored on the removable media or transfer it to the information apparatus side.

According to the cradle for the digital camera according to the present invention, it is possible, by providing the image display device and the control device on the cradle for mounting and removing the digital camera, to check the image stored in the camera by the image display device of the cradle. It is thereby possible to perform an erasing operation while checking the unnecessary images. In particular, it is feasible, by applying the present invention to the cradle of the camera of which image reproduction function is omitted, to supplement a fault of the camera lacking immediacy from the image-capturing operation to image erasure.

In addition, it is feasible, by providing a data storing device on the cradle for the digital camera, to transfer the image data in the camera to the cradle side so as to store it in the data storing device. In the case where the memory for storing the images on the camera side is insufficient, it can supplement the fault of the camera of which number of capturable images is limited since it can easily back up the image data by using the cradle of the present invention.

Furthermore, it is possible, by constituting the cradle to be capable of battery driving, to check the image and back up the data irrespective of the place. While a notebook-sized personal computer was carried in the past to check the image and back up the data, it is no longer necessary to do so because it can be substituted by the cradle of the present invention.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A cradle for an information apparatus, the cradle comprising:

an apparatus mounting section for removably receiving and surrounding a portion of a body of the information apparatus;

the cradle having an electrical connector in the apparatus mounting section, so that when the portion of the body of the information apparatus is within the mounting section the electrical connector connects to an electrical contact located on the portion of the body of the information apparatus;

a communication device which performs communication with the information apparatus mounted on the apparatus mounting section;

a display device which displays information based on data received from the information apparatus through the communication device; and a control device which controls delivery of the data by the communication device and also controls display of the display device and controls reading and writing of the data respectively from and to a memory in the information apparatus.

2. The cradle according to claim 1, further comprising:

a signal processing device which converts the data received from the information apparatus into a signal for display; and a storing device for display which stores the data for display generated by the signal processing device.

3. The cradle according to claim 1, further comprising:

a communication device for an external apparatus which performs communication with the external apparatus, wherein the control device controls the delivery of the data by the communication device for the external apparatus.

4. The cradle according to claim 1, wherein the data includes image data.

5. A cradle for a digital camera, the cradle comprising:
a camera mounting section for removably receiving and surrounding a portion of the body of the digital camera;
the cradle having an electrical connector in the apparatus mounting section, so that when the portion of the body of the digital camera is within the mounting section the electrical connector connects to an electrical contact located on the portion of the body of the digital camera;
a first communication device which performs communication with the digital camera mounted on the camera mounting section;
an image display device which displays an image received through the first communication device; and
a control device which controls delivery of data by the first communication device and also controls display of the image display device and controls reading and writing of the data respectively from and to a memory in the digital camera.

6. The cradle according to claim 5, further comprising:
a second communication device which performs communication with an external apparatus,
wherein the control device controls the delivery of the data by the second communication device.

7. The cradle according to claim 5, further comprising a battery for a power supply so as to be usable by battery driving.

8. The cradle according to claim 5, wherein the digital camera comprises:
an image pickup device which converts an optical image into an electric signal;
an image-capturing instruction device which instructs the image pickup device to perform image-capturing;
an internal storing device which stores the image obtained through the image pickup device according to an instruction from the image-capturing instruction device; and
a third communication device which performs delivery of information with the cradle, the third communication device being connected to the first communication device in synchronization with operation of mounting of the digital camera on the camera mounting section,
wherein the digital camera does not have: an image display device which displays the image stored in the internal storing device; and an external storing device which stores the image obtained through the image pickup device on a removable medium.

9. A camera system, comprising:
the cradle according to claim 5; and
said digital camera mountable on the cradle, the digital camera comprising:
an image pickup device which converts an optical image into an electric signal;
an image-capturing instruction device which instructs the image pickup device to perform image-capturing;
an internal storing device which stores the image obtained through the image pickup device according to an instruction from the image-capturing instruction device; and
a third communication device which performs delivery of information with the cradle, the third communication device being connected to the first communication device in synchronization with operation of mounting of the digital camera on the camera mounting section,
wherein the digital camera does not have: an image display device which displays the image stored in the internal storing device; and an external storing device which stores the image obtained through the image pickup device on a removable medium.

10. The cradle according to claim 5, wherein the data includes image data.

11. A cradle for a digital camera, the cradle comprising:
a camera mounting section for removably receiving and surrounding a portion of a body of the digital camera;
the cradle having an electrical connector in the apparatus mounting section, so that when the portion of the body of the digital camera is within the mounting section the electrical connector connects to an electrical contact located on the portion of the body of the digital camera;
a first communication device which performs communication with the digital camera mounted on the camera mounting section;
a data storing device which stores data received through the first communication device; and
a control device which controls delivery of the data by the first communication device and also controls reading and writing from and to the data storing device and controls reading and writing of the data respectively from and to a memory in the digital camera.

12. The cradle according to claim 11, further comprising:
an image display device which displays an image received through the first communication device,
wherein the control device controls display of the image display device.

13. The cradle according to claim 11, further comprising:
a second communication device which performs communication with an external apparatus,
wherein the control device controls the delivery of the data by the second communication device.

14. The cradle according to claim 11, further comprising a battery for a power supply so as to be usable by battery driving.

15. The cradle according to claim 11, wherein the digital camera comprises:
an image pickup device which converts an optical image into an electric signal;
an image-capturing instruction device which instructs the image pickup device to perform image-capturing;
an internal storing device which stores the image obtained through the image pickup device according to an instruction from the image-capturing instruction device; and
a third communication device which performs delivery of information with the cradle, the third communication device being connected to the first communication device in synchronization with operation of mounting of the digital camera on the camera mounting section,
wherein the digital camera does not have: an image display device which displays the image stored in the internal storing device; and an external storing device which stores the image obtained through the image pickup device on a removable medium.

16. A camera system, comprising:
the cradle according to claim 11; and
said digital camera mountable on the cradle, the digital camera comprising:
an image pickup device which converts an optical image into an electric signal;
an image-capturing instruction device which instructs the image pickup device to perform image-capturing;
an internal storing device which stores the image obtained through the image pickup device according to an instruction from the image-capturing instruction device; and a third communication device which performs delivery of information with the cradle, the third communication device being connected to the first communication device in synchronization with operation of mounting of the digital camera on the camera mounting section, wherein the digital camera does not have: an image display device which displays the image stored in the internal storing device; and an external storing device which stores the image obtained through the image pickup device on a removable medium.

17. The cradle according to claim 11, wherein the data includes image data.

* * * * *